United States Patent [19]
Cheng

[11] Patent Number: 5,590,230
[45] Date of Patent: Dec. 31, 1996

[54] OPTICAL FIBER CONNECTOR INCLUDING HOUSING WITH A PLURALITY OF SLOTS HAVING SECURING PLATES

[76] Inventor: Yu-feng Cheng, No. 7, Fu Hsing St., Tu Cheng Hsiang, Taipei Hsien, Taiwan

[21] Appl. No.: 585,439

[22] Filed: Nov. 13, 1995

[51] Int. Cl.⁶ ........................................... G02B 6/36
[52] U.S. Cl. .................... 385/77; 385/76; 81/136
[58] Field of Search ................ 385/77, 78, 83, 385/84, 60.15, 55, 66, 70, 75, 85, 76, 136, 81

[56] References Cited

U.S. PATENT DOCUMENTS

| | | | |
|---|---|---|---|
| 4,327,964 | 5/1982 | Haesly et al. | 385/55 |
| 4,787,695 | 11/1988 | Laor | 385/78 |
| 4,900,124 | 2/1990 | Lampert et al. | 385/73 |
| 5,044,719 | 9/1991 | Nakamura | 385/76 |
| 5,216,733 | 6/1993 | Nagase et al. | 385/60 |
| 5,301,250 | 4/1994 | Cheng | 385/76 |

*Primary Examiner*—Rodney B. Bovernick
*Assistant Examiner*—Hemang Sanghavi
*Attorney, Agent, or Firm*—Ralph F. Crandell; Dorsey & Whitney

[57] ABSTRACT

An optical fiber connector has a tubular housing which forms a lumen consisting of three portions having different inside diameters from large to small. The tubular housing has a plurality of parallel slots defined through a corresponding upper periphery and lower periphery thereof. A plurality of securing plates are allowed to be positioned inside the slots with two distal ends thereof substantially protruding slightly out of the slot. A hole is defined at the center of the plate for allowing a fiber to extend therethrough.

3 Claims, 4 Drawing Sheets

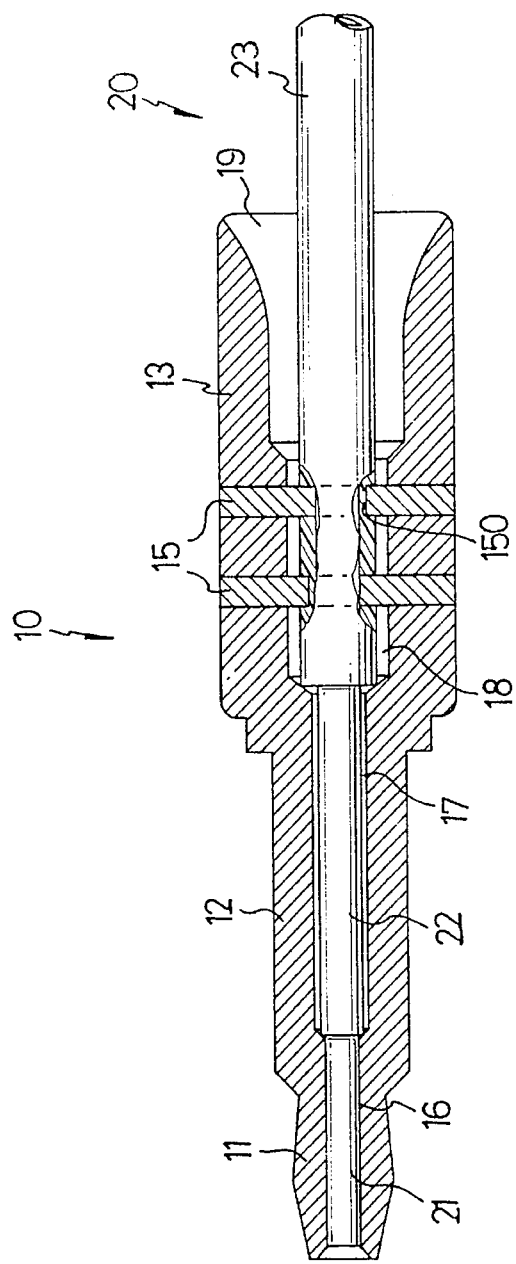
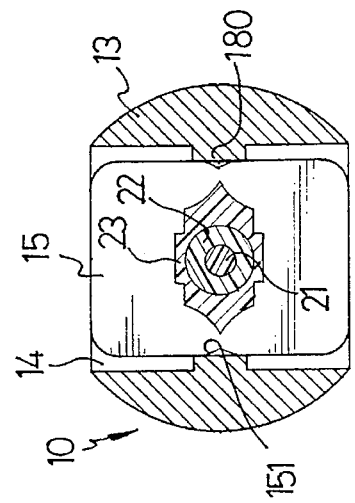
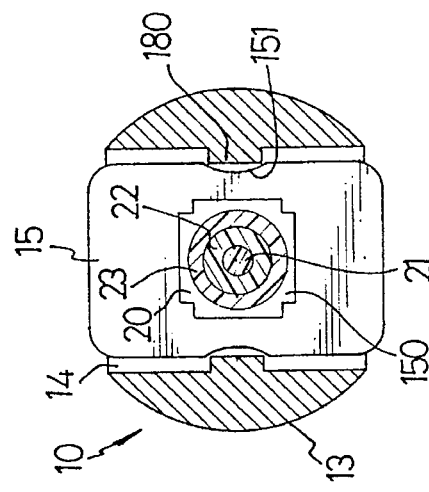

OPTICAL FIBER CONNECTOR INCLUDING HOUSING WITH A PLURALITY OF SLOTS HAVING SECURING PLATES

BACKGROUND OF THE INVENTION

This invention relates to an optical fiber connector and, more particularly, to an improved optical fiber connector for easy installation and manufacture.

A conventional optical fiber connector shown in FIG. 6 includes a housing 90 and a fiber 91 being inserted into the housing 90. The housing 90 is made of metal and has a rubber covering 901 sleeved into a front end of the housing 90. The fiber 91 defines a front portion 92 having a first outside diameter, an intermediate portion 910 having a second outside diameter larger than the first inside diameter and a rear portion 911 having a third outside diameter larger than the second inside diameter. The fiber 91 extends through the housing 90 and the front portion 92 projects out of the front end of the housing 90. The third outside diameter of the rear portion is larger than the inside diameter of the front end of the housing to prevent the rear portion of fiber sliding out of the housing. Then the fiber 91 is connected with the housing by a rivet.

Although this type of design can provide the fiber being connected with the connector, still there are disadvantages of this kind of the optical fiber connector. Firstly, the fiber 91 cannot be securely engaged to the housing because the fiber is connected with the housing only by the rivet. Secondly, the manufacture of the connector is complicated and cost of the manufacture is high. Therefore, it is requisite to invent a new fiber connector in which it is allowed to firmly secure the fiber easily and which also has a simple structure for easy manufacture.

SUMMARY OF THE INVENTION

It is an object of the present invention to provide an optical fiber connector.

These and additional objects, if not set forth specifically herein, will be readily apparent to those skilled in the art from the detailed description provided thereunder, with appropriate reference to the accompanying drawings.

BRIEF DESCRIPTION OF THE DRAWINGS

FIG. 3 is an enlarged sectional side view of FIG. 1 illustrating a securing plate of the connector;

FIG. 4 is a similar view of FIG. 3 except that the securing plate has pressure applied from both upper sides and lower sides thereof;

FIG. 5 is a cross-sectional view of an optical fiber connector having a fiber being received therethrough.

DETAILED DESCRIPTION OF THE PREFERRED EMBODIMENTS

Figure 1:
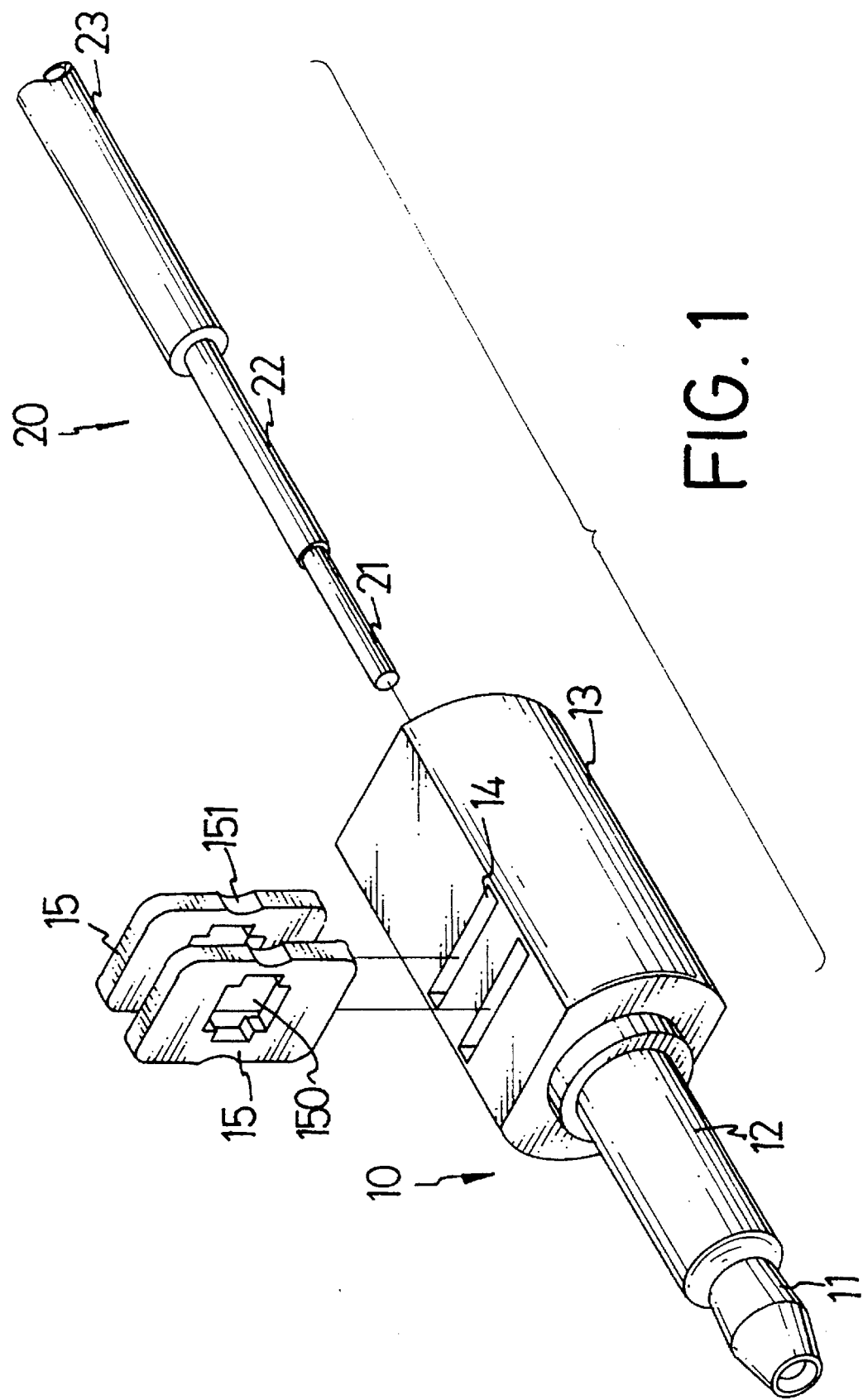
FIG. 1 is an exploded perspective view of an optical fiber connector having a fiber in accordance with the present invention.
Figure 2:
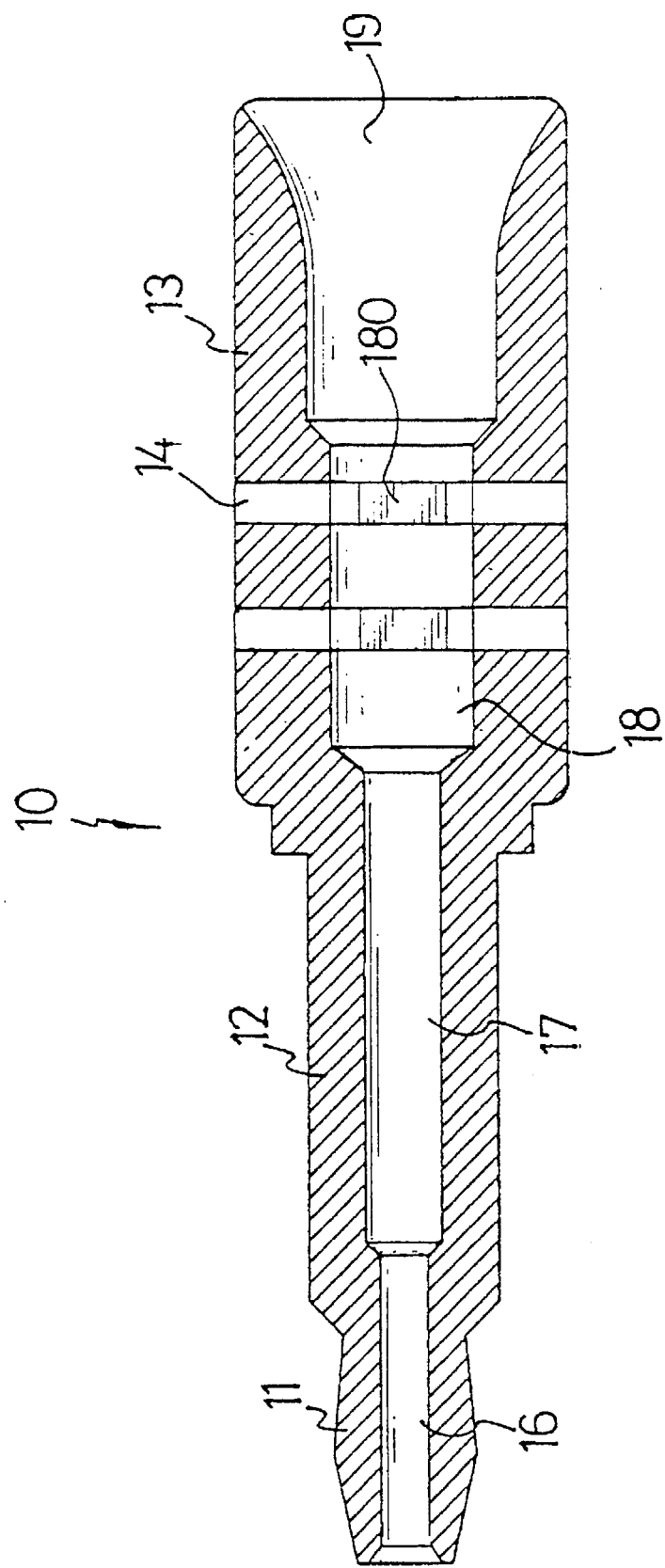
FIG. 2 is a sectional view of an optical fiber connector in accordance with the present invention.
Figure 6:
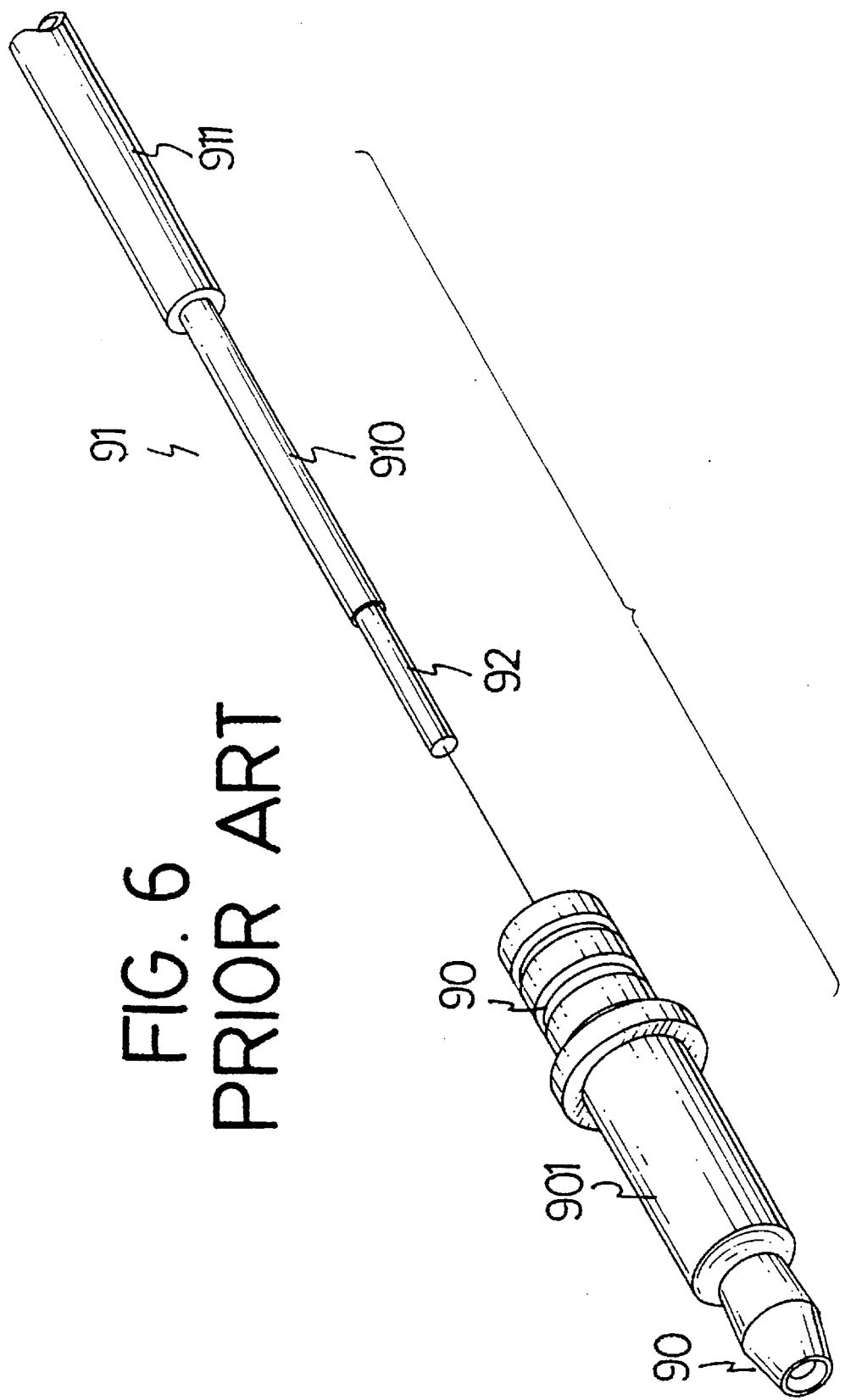
FIG. 6 is a perspective view of a conventional optical fiber connector.

Referring to the drawings and initially to FIG. 1, an optical fiber connector comprises a tubular housing 10, a plurality of slots 14 and a plurality of securing plate 15.

Referring to FIG. 5, the tubular housing 10 forms a base portion 13, an intermediate portion 12 extending integrally and forwardly from the base portion 13 and a head portion 11 extending integrally and forwardly from the intermediate portion 12. Additionally, the tubular housing defines a lumen including a distal portion 16 having a first inside diameter and adapted to receive a head portion of a optical fiber 21 an intermediate portion 17 having a second inside diameter larger than the first inside diameter, wherein the intermediate portion 17 is substantially adjacent to the distal portion 16 and adapted to receive a middle portion 22 of the optical fiber and a proximal portion 18 having a third inside diameter larger than the second inside diameter, wherein the proximal portion 18 is substantially adjacent to the intermediate portion 17 and adapted to receive a tail portion 23 of the optical fiber.

The plurality of slots 14, such as two parallel slots 14 in this embodiment, is each defined through a corresponding upper periphery and lower periphery of the base portion 13 of said housing, and the securing plate 15 is allowed to be positioned inside the housing 10 with two distal ends thereof substantially protruding slightly out of the slot 14. Referring to FIG. 3, each slot 14 has a horizontal width thereof defined by the distance of two opposite walls in the housing 10 for allowing the plate 15 to vertically slide therethrough. A hole 150 is defined in the center of the plate 15 and a recess 151 is defined at both sides of the plate 15. The proximal portion 18 has two lugs 180 formed thereon projecting inwardly therefrom corresponding to the recesses 151 and a counterbore 19 at the terminal thereof for allowing the fiber to be inserted.

As shown in FIG. 1, the optical fiber 20 consists of the head portion 21 having a first outside diameter, the middle portion 22 having a second outside diameter larger than the first diameter and the tail portion 23 having a third outside diameter larger than the second diameter. The outside diameter of the optical fiber is mated with the inside diameter of the distal portion of the tubular housing and the lengths of three portions of the optical fiber are in accordance with the lengths of three portions of the lumen of the housing 10.

In assembly, as shown in FIGS. 3, 4 and 5, firstly, each plate 15 is inserted into the corresponding slot 14; secondly, the fiber 20 is inserted through the hole 150; thirdly the plate 15 has two distal sides thereof protruding from the slot 12; fourthly, a press machine or the like is used to apply vertical pressure on upper and lower sides of the plate 15 as shown in FIG. 4, thus firmly fixing the fiber 20 in the hole 150 and fixing the plate 15 in the housing 10. As shown in FIG. 4, when the plate 15 receives pressure from top and bottom sides thereof, the vertical length thereof is shortened and the horizontal width especially near the hole 150 is enlarged, the hole 150 is deformed to be smaller thus firmly securing the fiber 20 and the horizontal width of recess 151 is enlarged and then the lug 180 of the proximal portion 18 is firmly received within the recess 151.

Referring to the FIG. 5, a central axis of the hole 150 in one plate 15 is lower than a central axis of the hole 150 in the second plate 15 thereby achieving a staggered passage through which the fiber 20 initially extends and is eventually secured. Such a staggered passage increases resistance to any longitudinal tension in the fiber 20.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

What the invention claimed is:

1. An optical fiber connector comprising:

a tubular housing which defines a lumen, including:

a distal portion having a first inside diameter and adapted to receive a head portion of a optical fiber;

an intermediate portion having a second inside diameter larger than the first inside diameter, wherein the intermediate portion is substantially adjacent to the distal portion and adapted to receive a middle portion of the optical fiber; and a proximal portion having a third inside diameter larger than the second inside diameter, wherein the proximal portion is substantially adjacent to the intermediate portion and adapted to receive a tail portion of the optical fiber;

a plurality of parallel slots each defined through a corresponding upper periphery and lower periphery of said housing; and a plurality of securing plates each being positioned inside said slot with two distal ends thereof substantially protruding slightly out of said slot, the securing plate defining a hole at the center of said plate and further defining a recess at both sides of said securing plate for firmly securing a fiber therethrough.

2. An optical fiber connector according to claim 1, wherein the tubular housing forms a base portion, an intermediate portion extending integrally and forwardly from the base portion and a head portion extending integrally and forwardly from the intermediate portion.

3. An optical fiber connector according to claim 1, wherein the hole of each securing plate has a central axis at a different height to another securing plate to provide a staggered passage between two corresponding securing plates.

* * * * *